United States Patent [19]
Ohta et al.

[11] Patent Number: 5,628,571
[45] Date of Patent: May 13, 1997

[54] BEARING STRUCTURE

[75] Inventors: Mutsuro Ohta, Kanagawa-ken; Kohji Takahashi, Sagamihara; Shingo Tsuda, Kanagawa-ken, all of Japan

[73] Assignee: International Business Machines Corporation, Armonk, N.Y.

[21] Appl. No.: 528,976

[22] Filed: Sep. 15, 1995

[30] Foreign Application Priority Data

Sep. 20, 1994 [JP] Japan .................................. 6-225115

[51] Int. Cl.$^6$ .............................. F16C 33/58; F16C 17/22
[52] U.S. Cl. ............................................. 384/518; 384/493
[58] Field of Search ................................... 384/493, 517, 384/518, 557, 563

[56] References Cited

U.S. PATENT DOCUMENTS

| | | | |
|---|---|---|---|
| 3,826,545 | 7/1974 | McKee | 384/493 |
| 4,672,250 | 6/1987 | Seitz | 384/518 X |
| 4,984,909 | 1/1991 | Shirotori | 384/493 |
| 5,207,514 | 5/1993 | Weissgerber | 384/518 X |

FOREIGN PATENT DOCUMENTS

| | | | |
|---|---|---|---|
| 35219 | 2/1990 | Japan | 384/493 |

*Primary Examiner*—Thomas R. Hannon
*Attorney, Agent, or Firm*—Merchant, Gould, Smith, Edell, Welter & Schmidt, P.A.

[57] ABSTRACT

A bearing structure used in a pivot bearing for freely supporting the rotation of a head arm of a hard disk drive (HDD). The bearing structure includes an inner shaft, an outer sleeve, a pair of roller bearings axially spaced and interposed between the inner shaft and the outer sleeve, and a preload spring for exerting a preload on the roller bearings. The roller bearings may be provided with an outer race that is attached to the outer sleeve. Nevertheless, the coefficients of linear expansion of the inner shaft and the outer sleeve are chosen so that they are different in an axial direction. Accordingly, the coefficients of linear expansion of the inner shaft and the outer sleeve are chosen so that the rotation torque derived from the preload becomes higher as the temperature rises and lower as the temperature falls. However, the rotational torque becomes lower as the temperature of a lubricant rises and higher as the lubricant temperature falls. Thus, the changes in the rotational torque as a result of temperature change are cancelled out.

13 Claims, 4 Drawing Sheets

BEARING STRUCTURE

BACKGROUND OF THE INVENTION

1. Field of the Invention

This invention relates in general to a bearing structure used in a pivot bearing for freely supporting the rotation of a head arm of a hard disk drive (HDD), and more particularly to a bearing structure which eliminates the temperature dependence of the rotational torque of a bearing.

2. Description of Related Art

In a hard disk drive, a magnetic disk is installed on a spindle motor and driven to rotate, and an actuator assembly is provided. According to the actuator assembly, an arm having a magnetic head at one end thereof is rotated with an actuator using a voice coil motor (VCM) to position the magnetic head over the magnetic disk so that reading and writing of magnetic data can be performed.

A pivot bearing is employed in the actuator assembly to freely support the rotation of the head arm. In the pivot bearing, a pair of bearings is spaced in the axial direction. In each bearing, the outer race is permanently attached to the outer sleeve of the head arm side, and an inner race is integrally formed with the inner shaft extending vertically from a base. A preload is exerted on the pair of bearings.

The hard disk drive is, incidentally, required to provide high-speed operation, be compact and inexpensive, and to deliver a low power dissipation.

For this reason, it is particularly necessary in the pivot bearing to make the startup torque small, because the startup and stopping of the pivot bearing are repeated. The startup torque is determined by the preload to be exerted on the pivot bearing and the nature or quantity of lubricant to be enclosed in the pivot bearing. If the preload is high, the startup torque will become large and, if the quantity of the lubricant is increased, the startup torque will become large.

With regard to the preload, if the coefficients of linear expansion of the inner shaft and the outer sleeve are different, the preload will be increased by the rise in temperature and the preload will be decreased by the fall in temperature, which means that the startup torque changes. In the conventional pivot bearing, the quality of the material of the inner shaft and the quality of the material of the outer sleeve are made the same to avoid having the preload become temperature-dependent.

However, on the one hand, if the bearing steel is used in both the material of the inner shaft and the material of the outer sleeve, passivation processing will be required to attach the outer sleeve to the outer race and it will also be necessary to use a coating of primer (hardening accelerator) prior to attachment. This increases the cost of the bearing.

On the other hand, when lubricant is enclosed in the pivot bearing, the startup torque becomes smaller as the lubricant temperature rises and larger as the lubricant temperature falls, because of the characteristic of the lubricant, as shown by the graph 400 in FIG. 4. FIG. 4 illustrates four lubricants 402, 404, 406, 408 with different coefficients of expansion. It is to be noted that, in the graph in FIG. 4, the axis of the ordinates represents temperature and the axis of the abscissas represents rotational torque, and each curve shows the characteristic of the lubricant at 1800 rpm for the various types of lubricants 402, 404, 406, 408.

Thus, it has been the practice to reduce the influence of the characteristic of the lubricant to a minimum by severely controlling the quality of material and the quantity of the lubricant, but this has its limitations and, consequently, the temperature dependence of the startup torque by the lubricant still remains.

It can be seen then that there is a need for a bearing structure which eliminates the temperature dependence of the rotational torque of a bearing and makes possible high-speed operation, low power dissipation, and other features that are required of a hard disk drive and in which the deterioration in the performance of the hard disk drive does not occur even under a temperature change.

SUMMARY OF THE INVENTION

To overcome the limitations in the prior art described above, and to overcome other limitations that will become apparent upon reading and understanding the present specification, the present invention discloses a bearing structure used in a pivot bearing for freely supporting the rotation of a head arm of a hard disk drive (HDD).

The present invention solves the above-described problems by providing a bearing structure with an inner shaft; an outer sleeve; a pair of roller bearings axially spaced and interposed between said inner shaft and said outer sleeve; and a preload means for exerting a preload on said roller bearings; wherein coefficients of linear expansion of said inner shaft and said outer sleeve being made different in an axial direction.

Thus, the coefficients of linear expansion of said inner shaft and said outer sleeve are made different so that the preload becomes higher as the temperature rises and lower as the temperature falls. The rotational torque becomes higher as the preload becomes higher due to an increase in temperature, and becomes lower as the preload becomes lower due to a decrease in temperature. Further, the rotational torque becomes lower as the temperature of a lubricant rises and higher as the lubricant temperature falls. Thus, the changes in the rotational torque as a result of temperature change are cancelled out.

An aspect of the present invention is that the roller bearings are provided with an outer race and the outer race is attached to said outer sleeve.

Another aspect of the present invention is that the temperature dependence of the rotational torque of a bearing may be eliminated.

Yet another aspect of the present invention is that the high-speed operation and the low power dissipation that are required of a hard disk drive are made possible.

Still another aspect of the present invention is that no deterioration occurs in the performance of the hard disk drive even under a temperature change.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a bearing structure used in a pivot bearing for freely supporting the rotation of a head arm of a hand disk drive (HDD).

Figure 1:
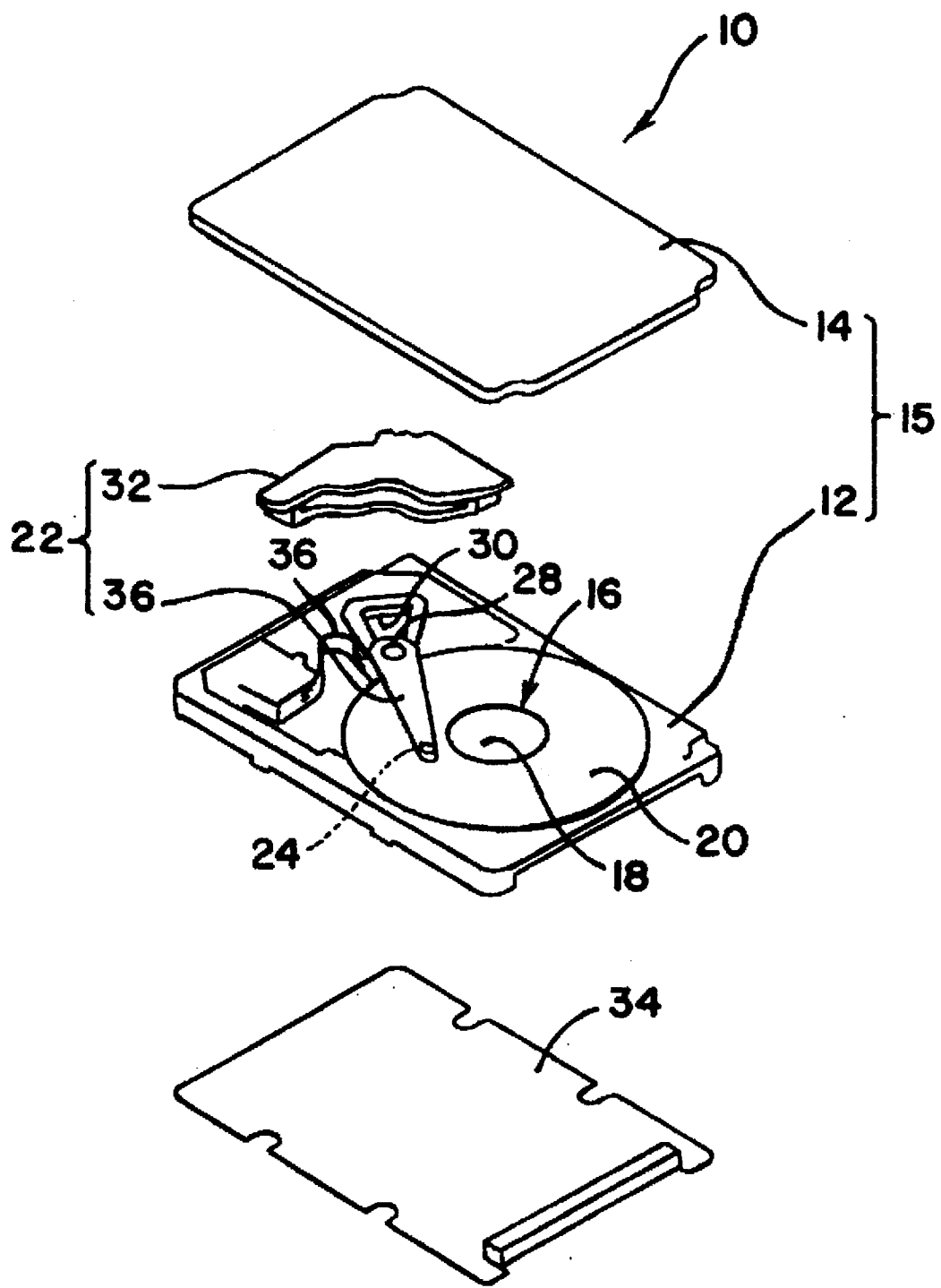
FIG. 1 is an exploded perspective view of a hard disk drive to which the embodiment of the present invention is applied.

As shown in FIG. 1, a hard disk drive 10 comprises an enclosure housing 15 in the form of a rectangular thin box, which includes a shallow bottom base 12 and a cover 14 for covering the upper open portion of the base 12 and which is arranged horizontally in a computer. Within the enclosure housing 15, a hub structure spindle motor 16 is provided on the inner surface (of the upper surface base) of the base 12, and magnetic disks (e.g., two magnetic disks coaxially) 20 are installed on the outer periphery of a hub 18. The horizontal surface of the magnetic disk 20 is driven to rotate by the spindle motor 16.

An actuator assembly 22 is also provided within the enclosure housing 15. The actuator assembly 22 is provided with a head arm 26 having a magnetic head 24 installed on one end thereof. The head arm 26 is supported at its intermediate portion on the base 12 through a pivot bearing 28 and is rotatable. The head arm 26 is provided at the other end thereof with a coil 30 and rotated by a voice coil motor (VCM) 32 in cooperation with the coil 30 (the coil and the VCM as a whole constitute the actuator). The rotation of the head arm 26 causes the magnetic head 24 to be positioned over the magnetic disk 20 in the radial direction, and magnetic data is written to or read from the magnetic disk 20 or erased by the magnetic head 24 positioned in this way.

To the outer surface (base undersurface) of the base 12 there is attached a card 34 which is a circuit board. The card 34 is connected to the head arm 26 and to the spindle motor 16 so that power and signals can be transmitted and received between the two. Reference numeral 36 is a flexible cable, which is installed within the enclosure 15 and used for connecting the card 34 and the head arm 26.

Figure 2:
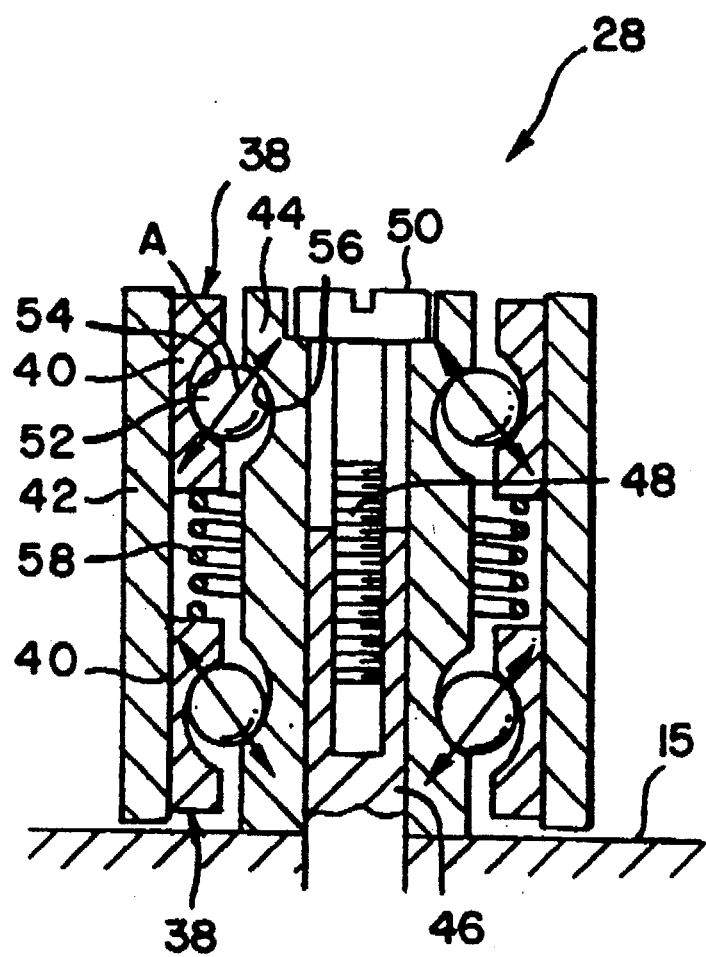
FIG. 2 is a vertical sectional view showing a direct pivot bearing constructed in accordance with an embodiment of a bearing structure of the present invention.

The above-described pivot bearing 28 is, on the one hand, provided with a pair of axially spaced roller bearings (hereinafter referred to simply to as bearings) 38 and 38, as shown in FIG. 2. In each bearing 38, the outer peripheral portion of an outer race 40 is attached to the inner peripheral portion of an outer sleeve 42, and the head arm 26 is installed on the outer peripheral portion of the outer sleeve 42. On the other hand, the inner race of the bearing 38 is integrally formed with an inner shaft 44 (i.e., the inner race and the inner shaft form a direct pivot bearing). The inner shaft 44 has a cylindrical shape and has inserted therein a shaft pin 46 extending vertically from the base 12. A bolt 48 is screwed from above into the upper portion of the shaft pin 46, and the upper end of the inner shaft 44 is pressed against the base 12 by means of the head 50 of the bolt 48.

The outer race 40 is formed with an orbit groove 54 having a circular arc section which is opposed to the ball 52 of the bearing 38 and larger in diameter than the ball 52. Likewise, the inner shaft 44 is formed with an orbit groove 56 having a circular arc section which is opposed to the ball 52 and larger in diameter than the ball 52. Between the opposed end faces of the outer races 40 and 40 of the bearings 38 and 38, there is interposed a coil spring (preload urging means) 58. The coil spring 58 encourages the outer races 40 and 40 into a direction in which they are spaced from each other, and the ball 52 received in the orbit grooves 54 and 56 exerts a load on the inner shaft 44 and the outer race 40 in an oblique direction (indicated by arrow A) in the axial direction. The load produces a preload. If the encouraging force (this encouraging force becomes a spacing force acting in a direction in which the outer races 40 and 40 are axially spaced) of the coil spring 58 is large, the preload will be large, and if the encouraging force of the coil spring 58 is weak, the preload will be small.

With this preload applied in advance, the inner peripheral portion of the outer sleeve 42 is permanently attached to the outer peripheral portion of the outer race 40.

At this point in time, on the one hand, lubricant is enclosed in the bearings 38 and 38. Depending on the characteristics of the lubricant (lubricating material), if the temperature of the lubricant rises, the rotational torque of the bearing 38 will become larger and, if the temperature falls, the rotational torque will become smaller and, as the temperature changes, the rotational torque changes.

On the other hand, the coefficients of linear expansion of the outer sleeve 42 and the inner shaft 44 in the axial direction are made different in such a manner that, as the temperature rises, the above-described spacing encouraging force is increased and the preload becomes higher and, as the temperature falls, the spacing encouraging force is reduced and the preload becomes lower. If the preload becomes higher, the rotational torque will become larger and, if the preload becomes lower, the rotational torque will become smaller.

The coefficients of linear expansion of the outer sleeve 42 and the inner shaft 44 are set so that the rotational torque change resulting from the temperature change of the lubricant is canceled with this preload change.

For example, as the quality of the material of the inner shaft 44 it is possible to use SUS440C, as the quality of the material of the outer race 40 it is possible to use SUS303, and, as the quality of the material of the outer sleeve 42 it is possible to use SUS303. Also, as the quality of the material of the coil spring 58 it is possible to use SUS304, and, as an adhesive it is possible to use Loctite 648UV (Japanese Locktire Co., manufacturer; name of article, Locktire 648 UV). Further, as a lubricant it is possible to use LY-255 (Japanese Lubricant Co., manufacturer; name of article, niguace W). In this housing, the coefficient of linear expansion of the inner shaft 44 made of SUS440C is $10.1 \times 10^{-6} (1/° C.)$ and the coefficient of linear expansion of the outer sleeve 42 made of SUS303 is $17.3 \times 10^{-6} (1/° C.)$. The coefficient of linear expansion of the outer sleeve 42 is made greater than that of the inner shaft 44 and, because of this difference between the coefficients of linear expansion, the spacing encouraging force is increased as the temperature rises, and the spacing encouraging force is decreased as the temperature falls.

According to the above-described construction, on the one hand, as temperature changes, the linear expansion difference occurs positively between the inner shaft 44 and the outer race 42 and, consequently the preload changes.

On the other hand, because of the characteristic of the lubricant enclosed in the bearing 38, the rotational torque change occurs with the temperature change.

If the preload changes, the torque change will occur, but the rotational torque change by the preload change resulting from the temperature change and the rotational torque change by the lubricant resulting from the temperature change are canceled. The rotational torque change as a whole has thus disappeared.

That is, a rotational torque change in which a preload becomes higher as the temperature rises and lower as the temperature falls, and a rotational torque becomes higher as the preload becomes higher and becomes lower as the preload becomes lower, and a rotational torque change in which a rotational torque becomes lower as the temperature of the lubricant rises and higher as the lubricant temperature falls of the lubricant falls are canceled.

With this, the temperature dependence of the rotational torque of the bearings 38 has been eliminated, together with the startup torque and the running torque. In the actuator assembly 22 of the hard disk drive 10, the high-speed operation and low power dissipation that are required of the hard disk drive 10 becomes possible, and no deterioration occurs in the performance of the hard disk drive 10 even under a change in the temperature. It is particularly effective in that a constant startup torque is obtained from the beginning without being changed, because the startup and the stopping of the head arm 26 are repeated.

In addition, making the coefficients of linear expansion of the inner shaft 44 and the outer sleeve 42 different makes it unnecessary that the quality of the material of the inner shaft 44 and the quality of the material of the outer sleeve 42 coincide with each other. According to this, for example, when the outer race 40 is attached to the outer sleeve 42, the invention is effective in that attachment becomes easy and the cost is reduced.

Figure 3:
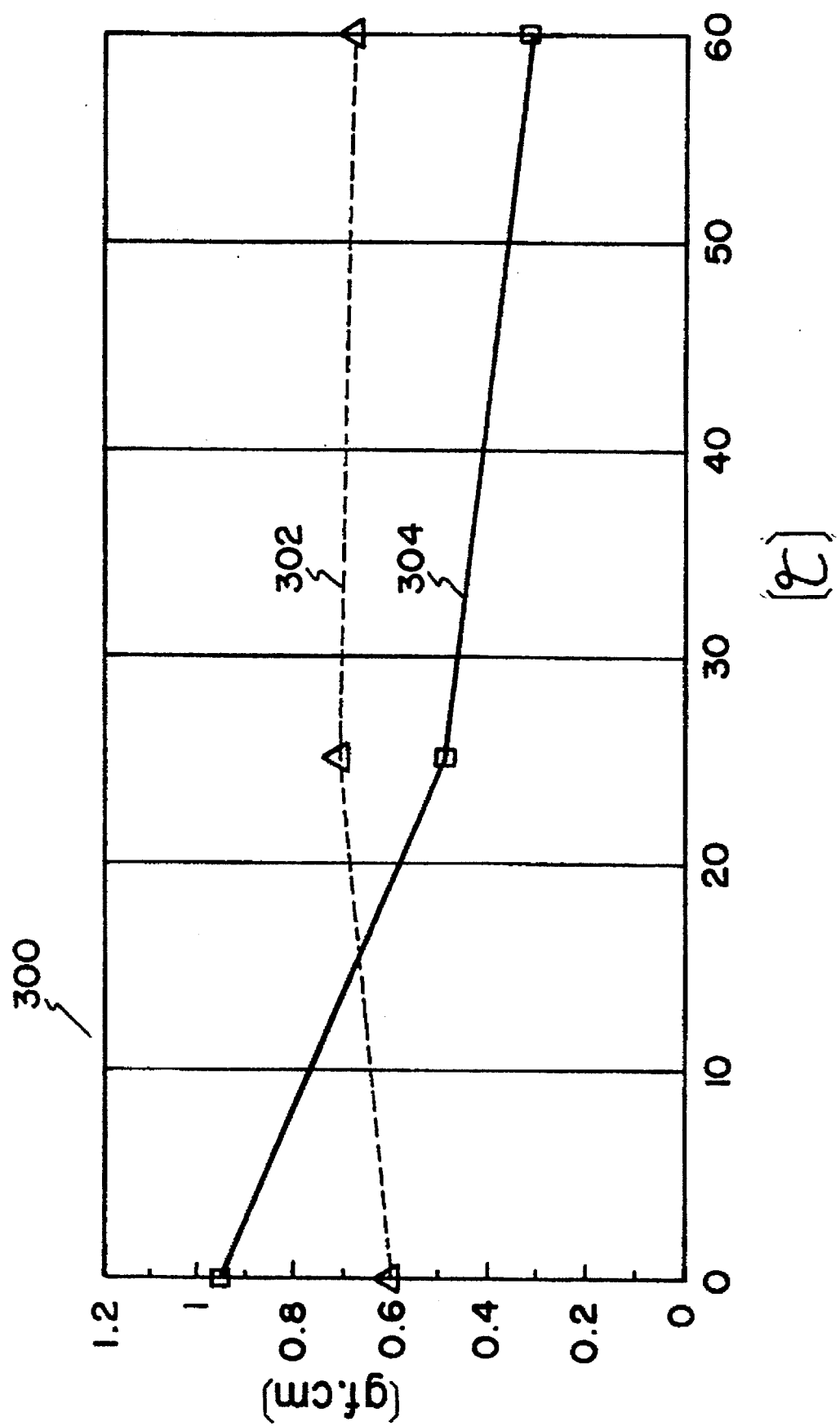
FIG. 3 is a graph showing the relationship between the temperature and rotational torque, the prior art and the present invention being compared.
Figure 4:
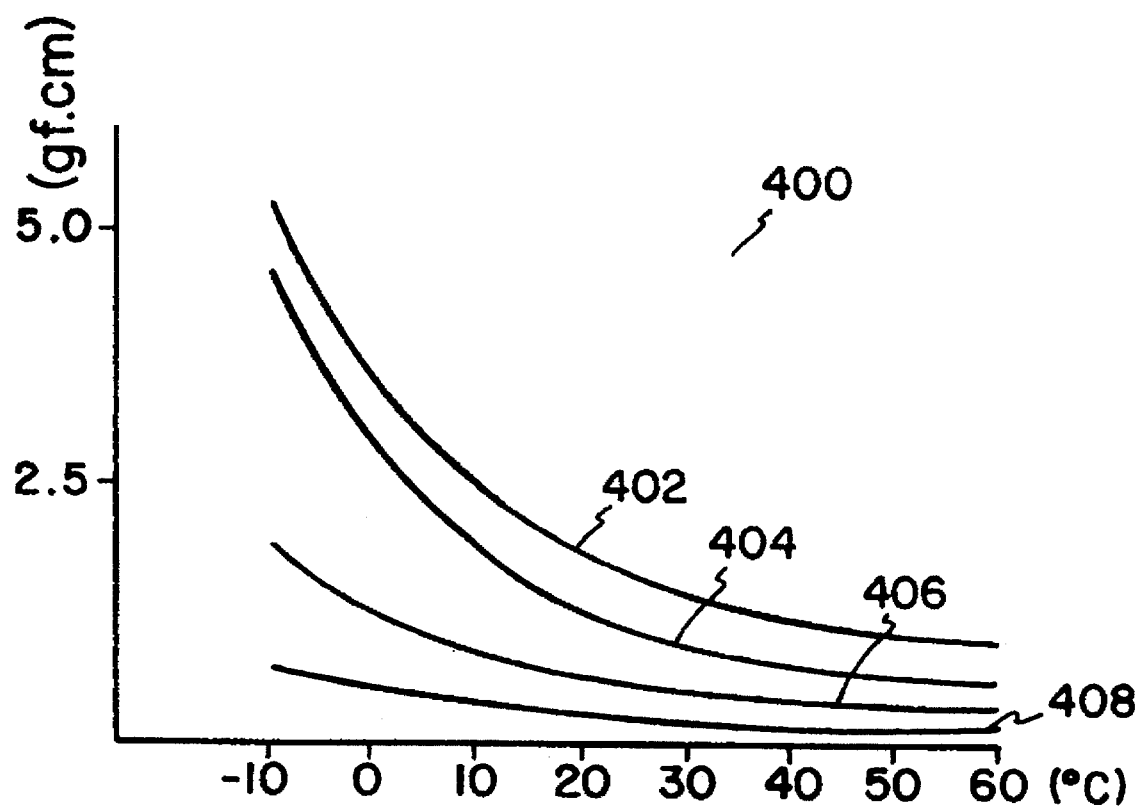
FIG. 4 is a graph showing the relationship between the temperature of lubricant and rotational torque.

FIG. 3 is a graph 300 showing the relationship between the temperature and rotational torque for the present invention 302 as compared to the prior art 304. As FIG. 3 illustrates, the rotational torque change resulting from the temperature change for a bearing structure according to the present invention 302 is suppressed and made constant. In contrast to the prior art 304, where the temperature dependence of the rotational torque by the lubricant still remains.

While, in the above-described embodiment, the preload has been exerted by the coil spring 58, the present invention is not limited to this but it may be exerted, for example, by a weight.

In addition, while the above embodiment has been described with reference to a direct pivot bearing in which the inner race of the bearing 38 is integrally formed with the inner shaft 44, the inner race and the inner shaft may be formed separately. Also, the bearing is not limited to the roller bearing of the above-described embodiment.

It is to be understood that the quality of the material of the inner shaft and the outer sleeve and the coefficients of linear expansion of the inner shaft and the outer sleeve are not limited to the above-described embodiment.

In summary, as temperature changes, a difference in the linear expansion occurs positively between the inner shaft and the outer shaft, so the preload changes.

On the other hand, because of the characteristic of the lubricant, a rotational torque change occurs as the temperature changes. If the preload changes, the rotational torque will change, but the rotational torque change by the preload change resulting from the temperature change and the rotational torque change by the lubricant resulting from the temperature change are canceled. The rotational torque change therefore disappears as a whole.

Thus, the coefficients of linear expansion of said inner shaft and said outer sleeve are made different so that the preload becomes higher as the temperature rises and lower as the temperature falls. The rotational torque becomes higher as the preload becomes higher due to an increase in temperature, and becomes lower as the preload becomes lower due to a decrease in temperature. Further, the rotational torque becomes lower as the temperature of a lubricant rises and higher as the lubricant temperature falls. Thus, the changes in the rotational torque as a result of temperature change are cancelled out.

With this, the temperature dependence of the rotational torque of the bearing is eliminated. Accordingly, the high-speed operation and the low power dissipation that are required from the hard disk drive become possible, and a deterioration in the performance of the hard disk drive does not occur even under a temperature change. It is particularly effective that a constant startup torque is obtained from the beginning without being changed, because the startup and the stopping of the head arm are repeated.

In addition, making the coefficients of linear expansion of the inner shaft and the outer sleeve different makes it no longer necessary for the quality of the material of the inner shaft and the quality of the material of the outer sleeve to coincide with each other. Accordingly, the outer race is attached to the outer sleeve, and the invention is effective in that the attachment becomes easy and the cost is reduced.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A bearing structure comprising:
   an inner shaft;
   an outer sleeve;
   a pair of roller bearings axially spaced and interposed between the inner shaft and the outer sleeve; and
   a preload means for exerting a preload on the roller bearings;
   wherein coefficients of linear expansion of the inner shaft and the outer sleeve being made different in an axial direction, and the rotational torque resulting from a temperature change because of the lubricant enclosed in the roller bearings has been canceled with the change in the preload resulting from the temperature change because of the different coefficients of linear expansion.

2. The bearing structure as set forth in claim 1, wherein the roller bearings are provided with an outer race, and the outer race is attached to the outer sleeve.

3. The bearing structure as set forth in claim 2, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

4. The bearing structure as set forth in claim 1, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

5. A bearing structure comprising:

an inner shaft;

an outer sleeve;

a pair of roller bearings axially spaced and interposed between the inner shaft and the outer sleeve; and a preload means for exerting a preload on the roller bearings;

wherein coefficients of linear expansion of the inner shaft and the outer sleeve being made different in an axial direction, and the change in rotational torque which, because of the lubricant enclosed in the roller bearings, becomes lower as the temperature rises and higher as the temperature falls being canceled with the change in the preload which, because of the different coefficients of linear expansion, becomes higher as the temperature rises and lower as the temperature falls.

6. The bearing structure as set forth in claim 5, wherein the roller bearings are provided with an outer race, and the outer race is attached to the outer sleeve.

7. The bearing structure as set forth in claim 6, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

8. The bearing structure as set forth in claim 5, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

9. A method of forming a bearing structure, comprising the steps of:

combining an inner shaft and an outer sleeve, each having coefficients of linear expansion that are different in an axial direction;

interposing a pair of axially spaced roller bearings between the inner shaft and the outer sleeve;

exerting a preload on the roller bearings, a first rotational torque derived from the preload increasing with a rise in temperature and decreasing with a fall in temperature as a result of the coefficients of linear expansion of the inner shaft and the outer sleeve being different;

applying a lubricant to the roller bearings, the lubricant exerting a second rotational torque, the second rotational torque becoming lower as the temperature of the lubricant rises and higher as the temperature of the lubricant falls, the first and second rotational torques being cancelled out.

10. A disk drive system, comprising:

a device enclosure having a bottom base and a cover;

at least one storage disk;

a motor, coupled to the device enclosure and the storage disk, for rotating the storage disk;

an actuator assembly, disposed within the enclosure housing, for moving a head arm relative to the disk, the head arm having a magnetic head installed on one end thereof, the head arm being rotatably supported at an intermediate portion on the base through a pivot bearing, the pivot bearing comprising:

an inner shaft;

an outer sleeve;

a pair of roller bearings axially spaced and interposed between the inner shaft and the outer sleeve; and a preload means for exerting a preload on the roller bearings;

wherein coefficients of linear expansion of the inner shaft and the outer sleeve being made different in an axial direction, and the rotational torque resulting from a temperature change because of the lubricant enclosed in the roller bearings has been canceled with the change in the preload resulting from the temperature change because of the different coefficients of linear expansion.

11. The disk drive system as set forth in claim 10, wherein the roller bearings are provided with an outer race, and the outer race is attached to the outer sleeve.

12. The disk drive system as set forth in claim 11, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

13. The disk drive system as set forth in claim 10, wherein, in an actuator assembly of a hard disk drive in which a head arm with a magnetic head at one end thereof is rotated to position the magnetic head over a magnetic disk so that magnetic information reading is performed, the roller bearings serve as a pivot bearing for freely supporting the rotation of the head arm.

* * * * *

UNITED STATES PATENT AND TRADEMARK OFFICE
CERTIFICATE OF CORRECTION

PATENT NO. :   5,628,571

DATED      :   May 13, 1997

INVENTOR(S) :  Ohta et al.

It is certified that error appears in the above-identified patent and that said Letters Patent is hereby corrected as shown below:

Title page, item [75], "Sagamihara" should read --Sagamihara-shi--

Col. 4, line 47-48: "Locktire" should read --Locktite--

Signed and Sealed this

Twentieth Day of January, 1998

Attest:

BRUCE LEHMAN

Attesting Officer

Commissioner of Patents and Trademarks